F. C. HEATH.
PROCESS AND APPARATUS FOR LINING A BEARING SHELL.
APPLICATION FILED JULY 13, 1918.

1,340,337. Patented May 18, 1920.
5 SHEETS—SHEET 3.

INVENTOR
Frank C. Heath
BY
William M. Swan
ATTORNEY

F. C. HEATH.
PROCESS AND APPARATUS FOR LINING A BEARING SHELL.
APPLICATION FILED JULY 13, 1918.

1,340,337.

Patented May 18, 1920.
5 SHEETS—SHEET 4.

INVENTOR
Frank C. Heath
BY
William M. Swan
ATTORNEY

F. C. HEATH.
PROCESS AND APPARATUS FOR LINING A BEARING SHELL.
APPLICATION FILED JULY 13, 1918.
1,340,337.
Patented May 18, 1920.
5 SHEETS—SHEET 5.
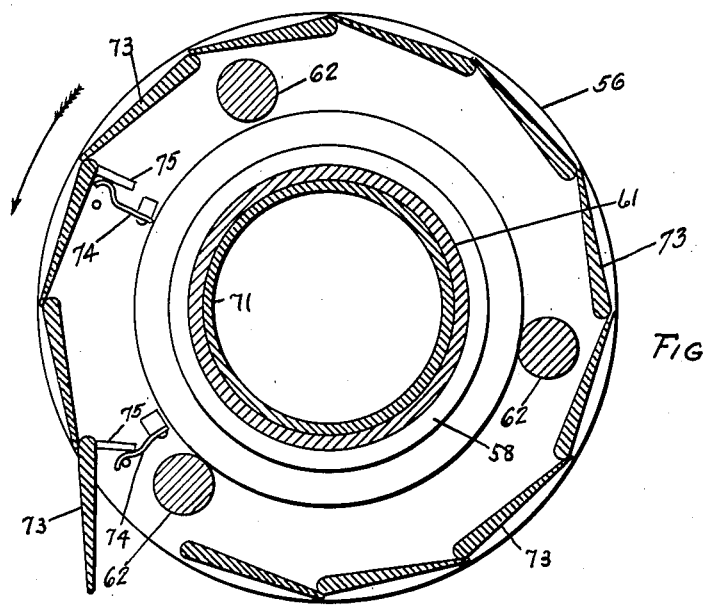
FIG. 8.
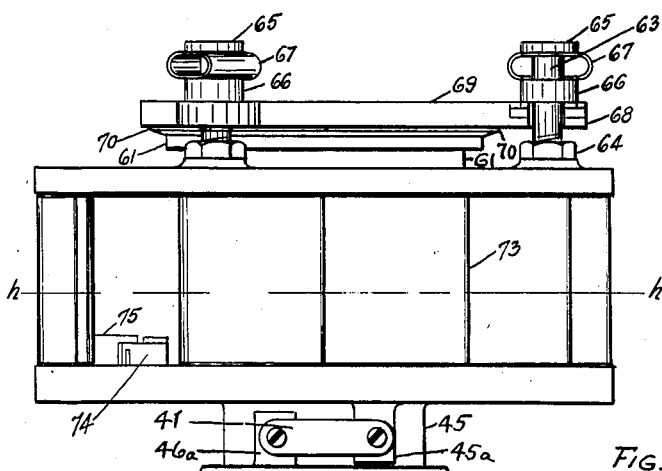
FIG. 7.
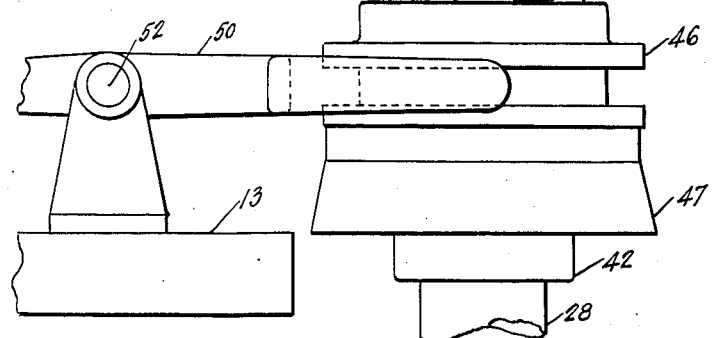
INVENTOR
Frank C. Heath
BY
William M. Swan
ATTORNEY

UNITED STATES PATENT OFFICE.

FRANK C. HEATH, OF DETROIT, MICHIGAN, ASSIGNOR, BY MESNE ASSIGNMENTS, TO LAWRENCE OLSEN, OF INDIANAPOLIS, INDIANA.

PROCESS AND APPARATUS FOR LINING A BEARING-SHELL.

1,340,337.   Specification of Letters Patent.   Patented May 18, 1920.

Application filed July 13, 1918. Serial No. 244,686.

*To all whom it may concern:*

Be it known that I, FRANK C. HEATH, a citizen of the United States, residing at Detroit, county of Wayne, State of Michigan, have invented a certain new and useful Improvement in Processes and Apparatus for Lining a Bearing-Shell, and declare the following to be a full, clear, and exact description of the same, such as will enable others skilled in the art to which it pertains to make and use the same, reference being had to the accompanying drawings, which form a part of this specification.

This invention relates to a process of, and apparatus for, lining the surface of a bearing shell with Babbitt or other applied metal, and to the product secured thereby, and has for its object an improved construction and organization of parts by which the metal can be applied with more nearly uniform thickness, and with a greater resulting freedom from blowholes and similar flaws in the metal, such as occur in such an unpleasantly large percentage of cases under the present practice of pouring molten babbitt into a space between the inner surface of the bearing shell and the peripheral surface of a temporarily inserted core.

Briefly, the application of the babbitt to the interior of the cylinder is accomplished by the centrifugal influence of a rapidly rotated frame or holder, in which the bearing shell of brass or other metal is placed, and into which the desired quantity of molten babbitt is poured. The very slight difference, if any, in the thickness of the applied coat of babbitt, at one end of the shell as compared with the other, is easily removed by no more than the usual and ordinary machining to secure exactness and smoothness of the internal bore of the bearing shell and when this is completed, there are no blowholes requiring soldering or other filling process, which is not only expensive in a labor sense, but unsatisfactory and unreliable as regards the metallurgical character of the bearing surface.

In the drawings:

Fig. 7 is an elevational view of a slightly modified form of rotatable shell-holding member, in which shutters or pivoted slat members are arranged about the bearing cylinder held within the shell.

Fig. 8 is a sectional plan of the devices of Fig. 7, taken along the line $h$—$h$ thereof.

Fig. 9 is a detail sectional elevation of the clutch-controlling lever for one of the rotatable shell-holding frames, and of the catch member under which it engages.

Figure 1:
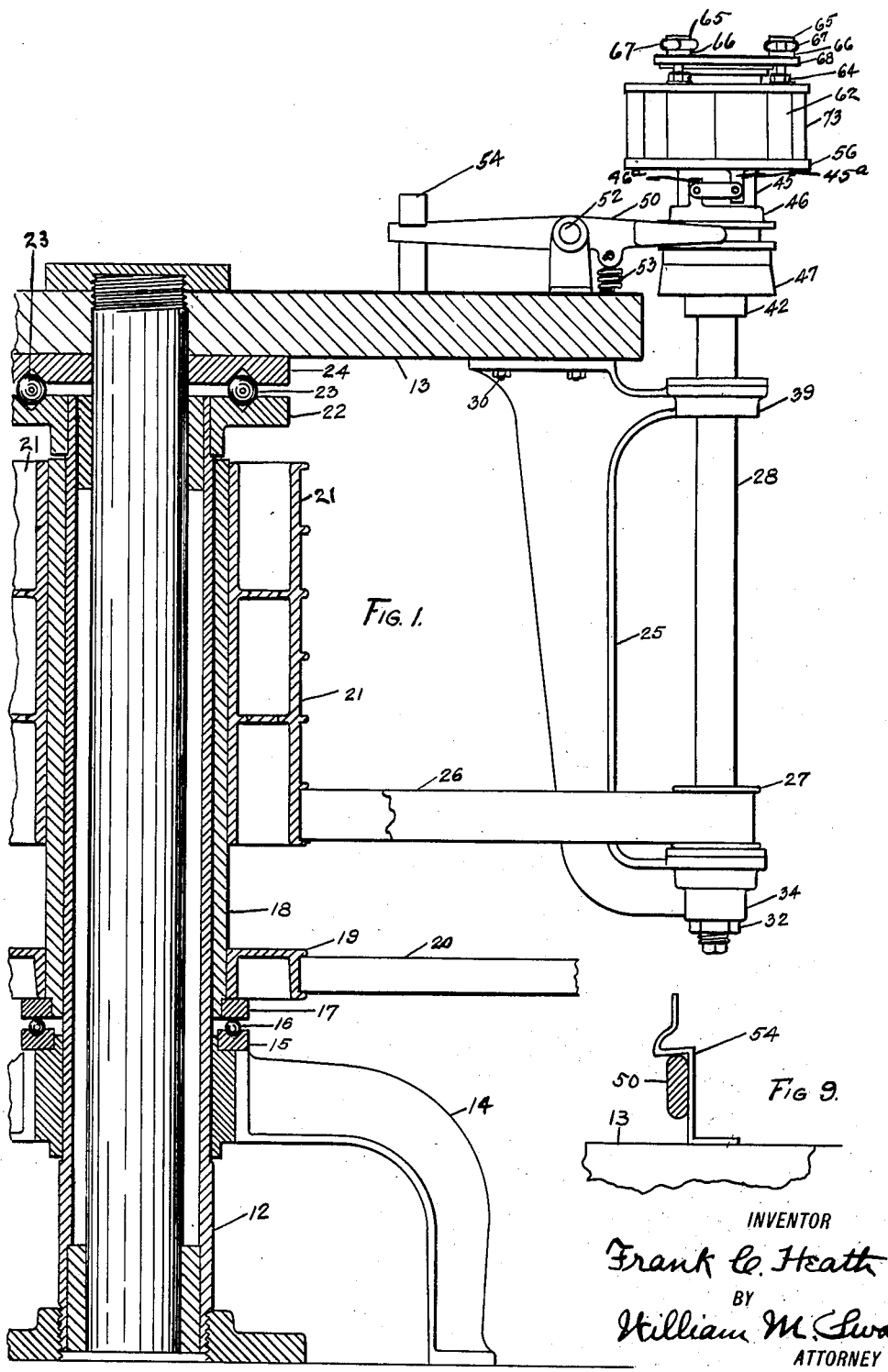
Figure 1 is an elevational view, partly in section, showing part of a pouring table with one of my improved centrifugally-acting devices in place near the edge thereof.

12 represents the central tubular standard for the table 13, steadied at its base by legs or standards 14. The annular top surface of each of these several standards 14 is formed as a ball race $1^k$ for the bearing balls 16, upon which rests the complementarily grooved lower collar 17 of the rotatable sleeve 18. Near the lower end of this sleeve 18 is fixed a pulley 19, over which the power belt 20 passes. Farther up on the sleeve 18 are located a series of auxiliary belt pulleys 21, corresponding in number to the number of frames or supporting brackets 25, which are arranged about the periphery of the table 13, and with which each is connected by one of the auxiliary endless belts 26. At the top of the central tubular standard 12 another ball race 22 is formed for the engagement of the bearing balls 23, which in turn are engaged from above by the ball race 24, fixed to the under surface of the table 13, whose easy rotation is thus provided for.

Figure 2:
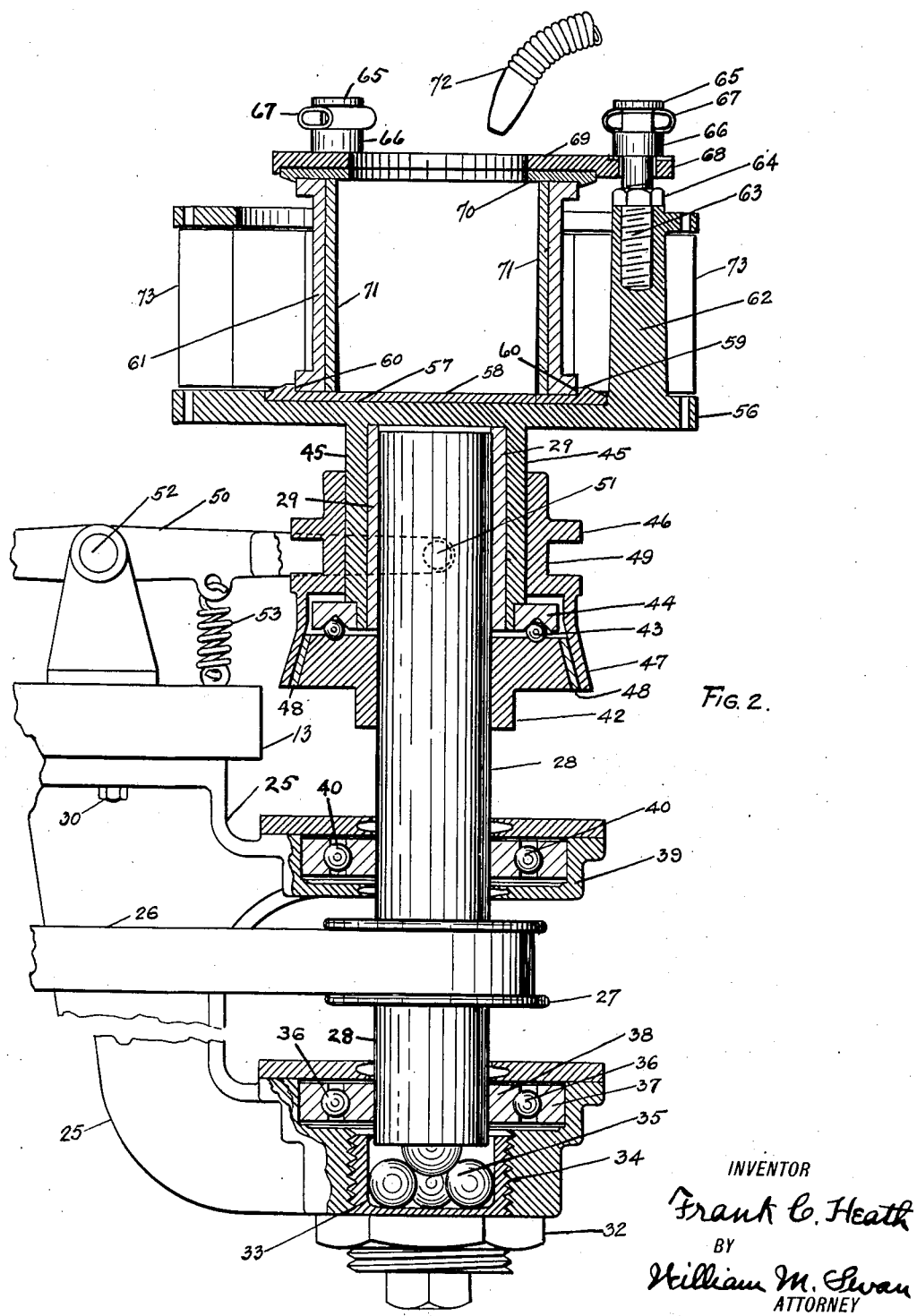
Fig. 2 is an enlarged sectional elevation of one of the rotatable shell-holding members as well as of its lower clutch and actuating connections.
Figure 3:
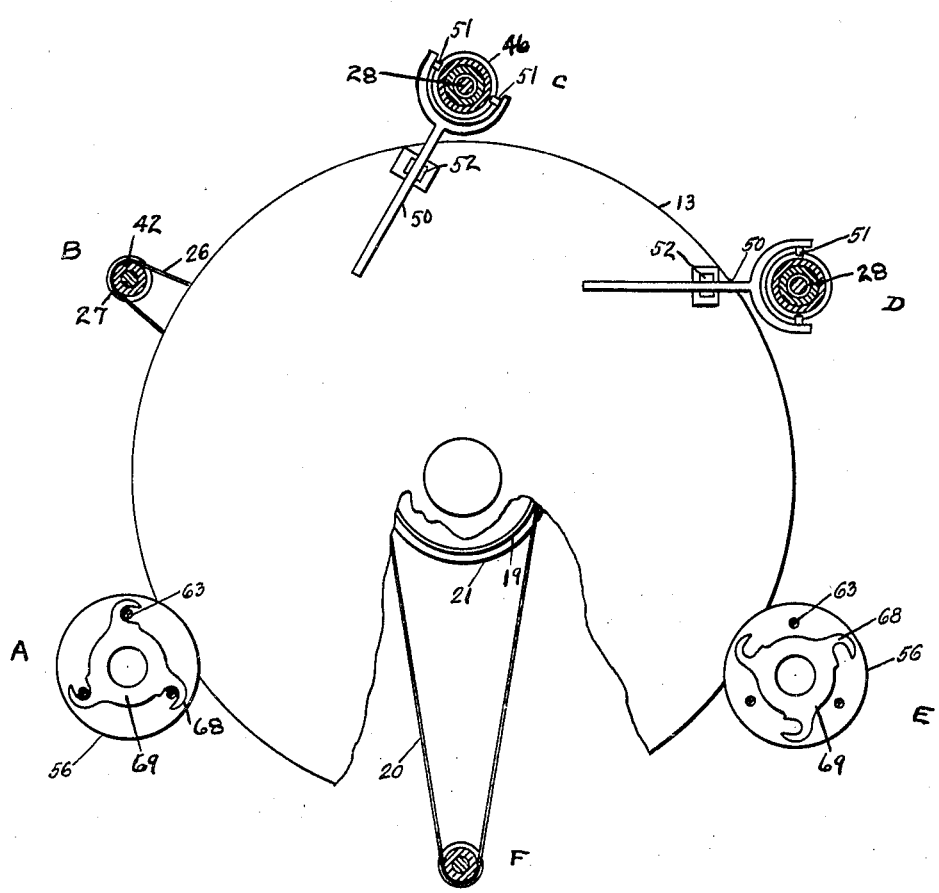
Fig. 3 is a plan view of a pouring table with several of these shell-holding members in place about the periphery thereof; as hereinafter explained more fully, the sectional plan views shown are all of the same device, but with the horizontal plane, through which the views are taken, varying in position.
Figure 6:
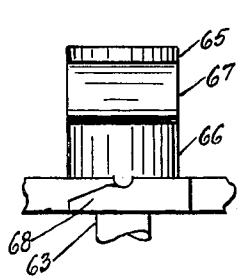
Fig. 6 is an enlarged detail view of the preferred form of locking means for the holding plate of Fig. 5.
Figure 4:
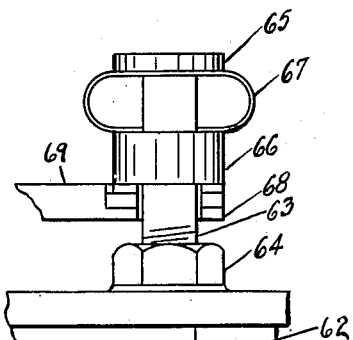
Fig. 4 is an enlarged detail elevation of the spring holding means for each of the vertical shell-holding studs of the rotatable cylinder-holding members.

Arranged at intervals about the periphery of the table 13, as shown particularly in Fig. 3, is a series of rotatable shell-holding frames 25, each of which has the spool 27 on the lower end of its central stem 28, engaged by one of the auxiliary power belts 26 as already stated. The depending holding bracket 25 is fixed, as by screws or a clamp 30 to the under surface of the table 13, adjacent its periphery, in such a way as to rotatably support the central stem 28 in vertical position; the nut 32 at the lower end of the rotatable stem may be removed when it is desired to disassemble the device. As shown particularly in Fig. 2, this nut 32 holds in place a hollowed-out ball holder 33, which is externally screw threaded, for engagement in a complementarily shaped and threaded chamber 34 in the lower end of the bracket or frame 25; within this holder are located balls 35, which take the end thrust of the rotatable stem 28, in whose hollowed-out end one of the balls is shown engaging. Just above the lower end of the stem 28 is arranged a series of balls 36, which engage between the raceway or interiorly grooved collar 37 in the body of the bracket and the exteriorly grooved collar or raceway 38, which is fixed about the stem 28; the upper end 39 of the supporting bracket 25 houses a similar ball bearing 40, and between these two portions of the rotatable stem 28 is located the power belt spool 27 already mentioned. When the several devices mounted about the periphery of the table are in operation, each central stem 28 is continuously rotating, under the influence of its power belt from the central belt pulley 21.

Near the upper end of each of these rotatable stem members 28 is fixed a collar or mushroom 42, in whose upper surface is formed a raceway for engagement of the bearing balls 43, upon which rests the grooved collar 44 which normally supports all of the shell-holding frame proper and its adjacent parts now to be described. This grooved collar 44 is fixed in the lower end of the tubular housing 45, which spacedly engages about the upper end of the rotatable stem 28, a fiber collar 29 being preferably employed for this purpose, and serving to keep the upper end of the shaft 28 from becoming heated. About its periphery is keyed the shell of the clutch member 46, whose inclined or conical lower edge 47 engages over the peripheral leathered clutch portion 48 of the collar 42; the links 41, connected at their ends to the studs 45ª and 46ª, serve to connect the housing 45 with the clutch shell 46. The body portion of the clutch member 46 is formed into a recessed annular portion 49, in which engage the tips or ends 51 of the Y-shaped clutch lever 50, which is pivoted in the top of the post 52, on the table 13. This clutch lever 50 is normally held with its crotched end in depressed position by means of the spring 53, but when the operation of each particular device is desired, as will be explained in greater detail in a later paragraph hereof, it may be locked in raised position, against the pull of the spring 53, by slipping its inner or plain end under the spring latch piece 54, shown in detail in Figs. 1 and 9.

Figure 5:
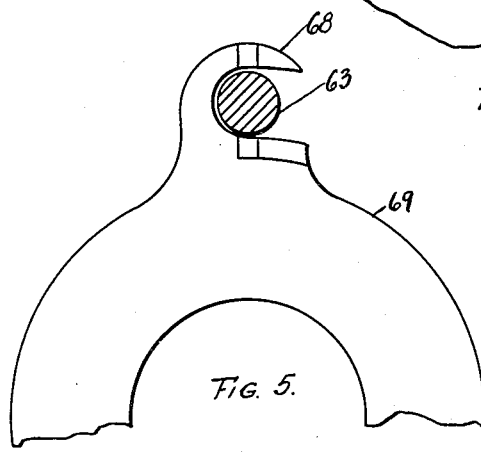
Fig. 5 is a fragmentary plan view of a part of the top holding plate or ring, which serves to hold the bearing cylinder in place in the frame.

Across the top of the tubular housing 45 is fixed a platform 56, in whose center is a circular depression 57, in which lies a plate 58, whose annular rim 59 incloses a circular space 60 of the diametrical size of the bearing shell 61, which is to be placed therein. From that portion of the platform 56, outside of the recessed central part just mentioned rise a plurality of pillars or standards 62, suitably spaced from one another. In the bored top of each of these engages the screw stem 63, capped by a nut 64, at the top of the pillar. That portion of the stem which extends above the nut carries at its extreme top a washer or cross bar 65, and slightly below that there slidably engages about the stem the collar 66, which is yieldingly pushed downwardly by the spring 67, which is interposed between the collar and the cross bar 65. That portion of each of the stems beneath the slidable collar and above the nut 64, is adapted to be engaged by one of the projecting hook portions 68 (shown in detail in Fig. 5), of the removable crown piece 69, which, when the shell piece 61 has been placed in position on the plate 58, is adapted to be fitted over the opposite or top end thereof; the central part of this crown piece being cut away to a diameter nearly equal to the internal diameter of the shell piece 61, and being fitted with a collar piece 70, for a tight clamping engagement over the upper end of the shell piece 61, these hooked portions 68 now engage loosely against the adjacent portion of the stem. A twisting movement of the entire crown piece, in order to force the hooks into tight engagement about the stem and under the spring pressed collars 66, is necessary to force each hook to the position relatively to the stem shown in Fig. 5 and in the lower left-hand portion of Fig. 3.

The operation of this device is as follows:

A suitable number of these individual shell handling devices are mounted at desired distances about the periphery of the rotatable table in the same manner as is followed in the present practice, wherein the pouring of the babbitt is into a bearing shell, whose center is occupied by a subsequently removable core. A suitably machined brass cylinder is then placed in position in the recessed center portion of the plate 58, on the platform 56, and clamped in the frame by the placing in position of the crown piece just described. Preferably the inner surface of the cylinder has previously been prepared for facilitating the adhesion of the babbitt by heating and by a coating or "wash" of tin. The clutch body 46 is then lowered by releasing the clutch lever 50 from its latch piece 54, thus permitting the spring 53 to act. Since the central stem member 28 is under continuous rotation, this results in the rapid rotation of all the parts supported by the clutch shell 46. While the shell-holding parts and their contained brass cylinder are thus being rotated, a suitable quantity of molten babbitt is poured through the central aperture of the crown piece 69, falling on the top surface of the plate 58; this molten babbitt is, however, instantly flung against the inner surface of the cylinder, and I have found by experiment that by imparting thereto a sufficiently high rotative speed, its application and adherence over the various parts thereof is remarkably uniform; and provided the rotation is started promptly enough after molten babbitt has been poured into the cylindrical shell and onto the plate 58, the proper quantity of babbitt may be poured before the rotating mechanism is set in operation. Theoretically, as well as actually, there may be a slight difference between the thickness of the applied mass of babbitt at the top of the cylinder and at the bottom, and I have hinted at this by showing in Fig. 2 a slight tapering of the lines 71 indicating the babbitt wall from top to bottom. This is, however, so slight that it is amply cared for and removed by the ordinary machining necessary to finish off the part after the babbitt has cooled. The flinging of the babbitt into contact with the relatively cool brass, of course, effects its rapid cooling and hardening. But this process may, if desired, be hastened and made more uniform in its results by a cooling stream of air from the over-engaging pipe 72, connected with a suitable pump or other means (not shown).

When the apparatus and its contained cylinder or bearing shell have been rotated for the time period which experience may show to be necessary, the clutch 46 is disengaged from the periphery 48 of the collar 42 by depressing the outer end of the lever 50 and slipping the same under the latch piece 54; the table 13 is then turned by the operator to the degree necessary to place the next shell-holding apparatus in convenient position for pouring of babbitt into its brass cylinder, as already described. By the time the device into which the babbitt was first poured, has, by the rotation of the table, reached a diametrically opposite position from the operator, the babbitt within the brass shell will have cooled sufficiently for the babbitt lined cylinder to be removed from the holding frame by an assistant, who, at the same time, if desired, clamps in position another brass cylinder for his principal to pour the babbitt into when its turn is reached in the table's rotation.

In Figs. 7 and 8 I have illustrated, in elevation and sectional plan respectively, a slightly modified form of shell-holding frame, in which there is present, in addition to the parts already described, a series of pivoted shutters or vanes 73; arranged about the periphery of the platform 56, and each slightly overlapping another with its free or unpivoted edge. When the device is at rest, these vane members are yieldingly held by the springs 74 in closed position, so that the bearing shell and its holding parts such as the standards 62 are housed therewithin. When, however, the platform is rotated in the direction shown by the arrow in Fig. 8, the tendency of the springs to hold these vanes or shutters in closed position is overcome by the rapid rotation of the platform and its supported parts, resulting in swinging each of these shutter members to the open position shown in the lower left hand portion of Fig. 8, forming a sort of fan on the shell. This construction is designed to supplement the cooling influence of a current of air when used upon the metal walls of the cylindrical bearing shell, by directing air inwardly along the inner surface of each shutter as it lies in open or swung-out position. As soon as the rotative movement ceases, the influence of the springs 74 upon the laterally projecting pieces 75 results in restoring the shutters to closed position.

It will, of course, be understood that while I have used such terms as "babbitt", "bearing shell" and the like, I desire this disclosure to be understood as applicable to, and contemplated for, any similar use involving the application of any metal or mixture of several metals of relatively low melting point, to the interior surface of an article made from a metal or compound of higher thermal characteristics. As to all such uses, my experiments have shown that the coating or lining of metal thus centrifugally applied is of much more uniform consistency, and is characterized by an absence of blow holes or bubbles, as contrasted with the method of direct pouring into a nonrotating and core-centered shell heretofore followed; and while I have illustrated the individual shell-rotating devices as mounted upon a movable table and actuated by belt mechanism, it is obvious that any convenient method of mounting could be followed, and any well-known actuating means employed for effecting their rotation.

What I claim is:—

1. The combination, with a supporting table, of a plurality of rotatable frame members arranged about the periphery thereof, and individually connected with a distributing source of power, each of said frame members being provided with means for holding a cylindrical shell member upon its top surface in coaxial position with its center of rotation.

2. In combination with a rotatable platform, means for detachably securing a cylinder to the top surface of said platform, means for rotating said platform about the axis of the cylinder, and a plurality of pivoted vane members normally lying in inclosing position thereabout, and being adapted to be swung outwardly by the rotation of the platform, thereby directing cooling air against the outer surface of the cylinder.

In testimony whereof I sign this specification in the presence of two witnesses.

FRANK C. HEATH.

Witnesses:
PAUL B. MOODY,
WILLIAM M. SWAN.